United States Patent Office 2,919,997
Patented Jan. 5, 1960

2,919,997
PROCESS OF TREATING ALUMINOUS CEMENT AND PRODUCT

Herbert A. R. Zehrlaut, Hicksville, N.Y., assignor to Zeco Research Corporation, Tallahassee, Fla., a corporation of Florida No Drawing. Application April 12, 1957
Serial No. 652,364

Claims priority, application Germany April 16, 1956

8 Claims. (Cl. 106—104)

The present invention relates to a process of treating aluminous cements and to a product obtained thereby.

Aluminous cement is a hydraulic cement the setting of which is due to the formation of various calcium aluminates whereby aluminum hydroxide is set free. A number of such aluminous cements contain sulfides, for instance, calcium sulfide. The amount of sulfur in such a cement may reach about 1.5% by weight. Calcium sulfide is formed in aluminous cements by the reduction of gypsum which is always used in the composition of the cement raw clinker. As a rule, the formation of calcium sulfide in the manufacture of certain aluminous cements cannot be avoided. These sulfides generate hydrogen sulfide on contact with moisture. The obnoxious odor of hydrogen sulfide is very noticeable even in high dilution and, therefore, is highly objectionable.

It is one object of the present invention to provide a process of treating such aluminous cements so as to control and/or eliminate in a simple and practical manner the hydrogen sulfide generation and odor on mixing such a cement.

Another object of the present invention is to provide an aluminous cement ready for use which, on mixing with water, does not generate hydrogen sulfide and, therefore, does not annoy the workers mixing the cement with water and aggregates.

Other objects of this invention and advantageous features thereof will become apparent as the description proceeds.

In principle, the process according to the present invention consists in adding to the aluminous cement a per-compound which is capable of splitting off oxygen and/or ozone on contact with moisture and which is compatible with the aluminous cement. Such compounds which are capable of splitting off oxygen and/or ozone on contact with moisture are, for instance, the water soluble peroxides and per-compounds of alkali metals and alkaline earth metals. The preferred reactive compounds are the alkali metal peroxides and especially sodium peroxide. Hydrogen peroxide may also be used when added to the mixing water.

The water soluble per-compounds which split off oxygen and/or ozone on contact with moisture are added to the aluminous cement at any given time after its manufacture. They may be added, for instance, in the cement factory after the cooling phase or, before mixing the cement, by the consumer. They may also be added to the mixing water used for preparing the mortar mixtures. The reaction taking place on mixing the cement with water in the presence of a per-compound which, on contact with moisture, splits off oxygen and/or ozone, such as sodium peroxide, is a hydrolytic process and proceeds at normal temperature according to the following equations:

$$CaS+2H_2O=Ca(OH)_2+H_2S \quad \text{odor}$$
$$H_2S+Na_2O_2=2NaOH+S \quad \text{odorless}$$

Summation equation:

$$CaS+2H_2O+Na_2O_2=Ca(OH)_2+2NaOH+S$$

Formation of oxides, such as sulfur trioxide, and their reaction products, such as sulfuric acid, sodium sulfate, or calcium sulfate may take place due to progressive oxidation with the added per-compound or the oxygen of the air.

It is evident from the above given summation equation that the hydrogen sulfide formed on mixing cement with water is intercepted in statu nascendi and is oxidized to odorless sulfur. Further possible oxidation of the sulfur is of no importance with respect to the elimination or prevention of the generation of obnoxious hydrogen sulfide.

The addition of the per-compounds used for eliminating the offensive odor of hydrogen sulfide according to the present invention has a further advantage. For instance, when using alkali metal peroxides, the primarily formed alkaline-reacting hydroxides, such as sodium hydroxide, and the secondarily formed salts, such as sodium sulfate, react with the calcium aluminates formed during the hardening period and, thereby have a regulating effect upon the hardening or setting cycle of the cement. As a result thereof, the hardening or setting time is shortened in proportion to the added peroxide. The final oxidation products of sulfur, such as sulfur trioxide, sulfuric acid, or sulfates have a regulating influence on the acceleration of the hardening or setting time of the calcium aluminates.

The amount of added per-compound splitting off oxygen and/or ozone on contact with moisture and being compatible with aluminous cement, is dependent on the sulfur content of such a cement. As follows from the above given equation, one mol of calcium sulfide of the molecular weight of 72.15 requires, for instance, one mol of sodium peroxide of the molecular weight of 77.99. Consequently, at least about 78 g. of sodium peroxide or equimolecular amounts of other per-compounds must be added for 32 g. of sulfur. Thus, if the aluminous cement contains 1.5% of sulfur, at least 3.6 g. of sodium peroxide must be added per 100 g. of cement.

Since the addition of such an amount of sodium peroxide results in the formation of 1 mol of calcium hydroxide and 2 mols of sodium hydroxide, calculated for each mol of calcium sulfide present in the cement, the hardening or setting time is accelerated by about 30%. It was found, for instance, that with a cement which, without the addition of sodium peroxide, sets within about 290 minutes, the hardening or setting time was reduced by the addition of sodium peroxide to about 203 minutes.

The per-compounds which, on contact with moisture, are capable of splitting off oxygen and/or ozone, can be admixed to the aluminous cement in the required amount, as determined by analysis, in the cement factory. It is, of course, also possible to admix such per-compounds to the cement on the job, i.e. where the cement is mixed with water and the aggregates. The compounds which are capable of splitting off oxygen and/or ozone can also be added in the form of their aqueous solutions to the cement or the mixture with water and the aggregate. Of course, care must be taken that the hydrogen sulfide-eliminating or reducing compounds according to the present invention are stored under conditions whereby no substantial premature decomposition can take place.

Especially suitable per-compounds which are capable of splitting off oxygen and/or ozone on contact with moisture and which are compatible with aluminous cement are, as stated above, alkali metal peroxides. Aqueous solutions of hydrogen peroxide can also be used, Other compounds which may be employed for the purpose of the present invention are, for instance, alkali metal perborates, alkali metal persulfates, and the like.

It is not necessary to add a substantial excess of said per-compounds, since the amounts calculated for the sulfur content of the cement are usually sufficient to sufficiently suppress generation of the obnoxious hydrogen sulfide.

The following examples serve to illustrate the present invention without, however, limiting the same thereto:

Example 1

An aluminous cement of the following composition:

| Components: | Percent |
| --- | --- |
| $Al_2O_3$ | 50.8 |
| $SiO_2$ | 5.8 |
| FeO | 1.3 |
| CaO | 39.8 |
| S | 1.0 |
| Other impurities | 1.3 | is mixed, during grinding of the cement clinkers, with 2.5 g. of sodium peroxide per 100 g. of cement.

The resulting cement mixture is filled in cement bags and is shipped.

On mixing 100 parts by weight of such a cement with 48 parts by weight to 60 parts by weight of water and the required amounts of fine sand and gravel in a concrete mixer, no noticeable odor of hydrogen sulfide is produced.

Example 2

For each 100 kg. of the cement used in Example 1 11 liters of an aqueous 10% hydrogen peroxide solution are added to the water used for mixing the cement in the concrete mixer. During mixing, no objectionable odor of hydrogen sulfide is detectable.

Example 3

100 parts by weight of an aluminous cement of the following composition are placed into a concrete mixer:

| Components: | Percent |
| --- | --- |
| $Al_2O_3$ | 68.5 |
| CaO | 24.7 |
| $SiO_2$ | 4.1 |
| FeO | 0.6 |
| S | 0.5 |
| Other impurities | 1.6 |

To this cement there are added 3.75 parts by weight of sodium persulfate ($Na_2S_2O_8$) and the cement is intimately mixed with said sodium persulfate. Thereafter, about 40 parts by weight of water and the required amount of sand and gravel are added and the resulting batch is mixed in a concrete mixer. No obnoxious hydrogen sulfide odor is apparent during mixing.

Of course, many changes and variations in the composition of the aluminous cement, in the type of compound capable of splitting off oxygen and/or ozone and compatible with aluminous cement, in the amounts admixed and the manner in which admixture of said compound to the cement is effected, and the like may be made by those skilled in the art in accordance with the principles set forth herein and in the claims annexed hereto.

I claim:

1. In a process of treating a calcium aluminate cement containing calcium sulfide which cement, on contact with moisture, develops hydrogen sulfide, the step which comprises admixing to such a calcium aluminate cement a per-compound splitting off oxygen on contact with moisture at room temperature, being compatible with the calcium aluminate cement, and not substantially affecting the strength properties of the final material obtained on mixing such cement with water, said per-compound being added to said cement at least in an amount equimolecular to the amount of sulfur present therein.

2. In a process of treating a cacium aluminate cement containing calcium sulfide which cement, on contact with moisture, develops hydrogen sulfide, the steps which comprise adding to the mixing water a water soluble per-compound splitting off oxygen on contact with moisture at room temperature and being compatible with said calcium aluminate cement, said per-compound being added to said cement at least in an amount equimolecular to the amount of sulfur present therein, and mixing the calcium aluminate cement with said mixing water, said per-compound inhibiting development of hydrogen sulfide on said mixing of cement with water.

3. A calcium aluminate cement composition containing calcium sulfide and a water soluble per-compound splitting off oxygen on contact with moisture at room temperature and not substantially affecting the strength properties of the final material obtained from said calcium aluminate cement by mixing with water, said per-compound being intimately admixed to said calcium aluminate cement at least in an amount equimolecular to the amount of sulfur present in said cement.

4. The process according to claim 1, wherein the per-compound splitting off oxygen on contact with moisture is an alkali metal peroxide.

5. The process according to claim 1, wherein the per-compound splitting off oxygen on contact with moisture is sodium peroxide.

6. The process according to claim 2, wherein the compound added to the mixing water is hydrogen peroxide.

7. An aluminous cement according to claim 3, wherein the per-compound splitting off oxygen on contact with moisture is an alkali metal peroxide.

8. An aluminous cement according to claim 3, wherein the per-compound splitting off oxygen on contact with moisture is sodium peroxide.

References Cited in the file of this patent

UNITED STATES PATENTS

| 1,694,338 | Patrouilleau | Dec. 4, 1928 |
| 2,099,176 | Scripture | Nov. 16, 1937 |

FOREIGN PATENTS

| 661,345 | France | July 24, 1929 |